United States Patent [19]
Lund et al.

[11] Patent Number: 5,474,264
[45] Date of Patent: Dec. 12, 1995

[54] LOW MASS VELOCITY-ABERRATION CORRECTING RETROREFLECTOR GEODETIC SATELLITE

[75] Inventors: Glenn Lund, Peillon; Lemuet Sylvain, Cannes-La-Bocca, both of France

[73] Assignee: Aerospatiale Societe Nationale Industrielle, France

[21] Appl. No.: 417,452

[22] Filed: Apr. 5, 1995

Related U.S. Application Data

[63] Continuation of Ser. No. 63,404, May 18, 1993, abandoned.

[30] Foreign Application Priority Data

May 18, 1992 [FR] France ............................. 92 05989

[51] Int. Cl.⁶ ............................................. B64G 1/36
[52] U.S. Cl. ............................. 244/171; 244/167; 342/7; 356/152.3
[58] Field of Search ......................... 342/7, 8, 9, 5; 356/4, 5, 152.3; 244/167, 171

[56] References Cited

U.S. PATENT DOCUMENTS

| | | | |
|---|---|---|---|
| 2,746,035 | 5/1956 | Norwood | 342/7 |
| 3,117,318 | 1/1964 | Jones | 342/7 |
| 3,308,464 | 3/1967 | Lewis | 342/7 |
| 3,480,232 | 11/1969 | Wyatt | 244/167 |
| 3,567,155 | 3/1971 | Gatlin et al. | 244/167 |
| 3,582,020 | 6/1971 | Wrench | 244/167 |
| 4,241,349 | 12/1980 | Connell | 342/7 |
| 4,964,722 | 10/1990 | Schumacher | 356/152.3 |
| 5,097,265 | 3/1992 | Aw | 342/7 |
| 5,202,743 | 4/1993 | Lund et al. | 356/152.3 |

OTHER PUBLICATIONS

NASA Report A–524–63–59, Feb. 13, 1959.
IEEE Transactions on Geoscience and Remote Sensing, vol. GE–23 No. 4, pp. 398–413.
Raumfahrtforschung, vol. 13, Oct. 5, 1969, pp. 228–235.
La Recherche Spatiale, vol. 10, Oct. 5, 1971, pp. 15–18.

*Primary Examiner*—Galen L. Barefoot
*Attorney, Agent, or Firm*—Remy J. VanOphem; John VanOphem

[57] ABSTRACT

A spacecraft for geodetic applications designed to travel along a trajectory in an orbital plane around a planet, embodying at least one cube corner retroreflector designed to face the planet at least temporarily and having an apex, a normal, and three faces which are substantially orthogonal with respect to one another, to within an arcminute, forming three dihedral angles at substantially equal angular distances from this normal, the effective diameter of this cube corner being at least 3 centimeters, the apex being located, relative to the center of mass of the spacecraft, at a distance whose projection on an imaginary line joining the center of mass to the center of the planet remains at all times at a known value to within variations of less than 5 centimeters.

34 Claims, 3 Drawing Sheets

LOW MASS VELOCITY-ABERRATION CORRECTING RETROREFLECTOR GEODETIC SATELLITE

This is a continuation of application Ser. No. 08/063,404, filed May 18, 1993, now abandoned.

BACKGROUND OF THE INVENTION

This invention deals with a satellite, preferably of low mass (typically below 500 kg or even below 100 kg depending on whether it is classified as a minisatellite or a microsatellite) for long distance laser ranging, that is the accurate measurement of the separation of two points far removed one from the other. To this end, it is known to install a transmitter-receiver laser unit at one of these points and a retroreflecting target at the other point: the distance measurement is derived from the time required for a laser pulse to travel in one direction, between the transmitter-receiver and the target.

As an example, one may have to measure distances of several hundreds (or even thousands) of kilometers with an accuracy of the order of a few centimeters. Typically, the distance between a point on the Earth and an object in space (a spacecraft or a natural satellite (moon) or an artificial satellite orbiting the Earth), or more generally between two space-borne bodies, such as a spacecraft orbiting another planet and the like, may need to be measured. By accumulating such measurements and using several targets, the distances for example between several points on the terrestrial globe may then be determined with accuracy using triangulation techniques or the like.

In practice, the retroreflecting target embodies one or several retroreflectors, which preferably have three mutually orthogonal and contiguous plane reflector faces, assembled so as to form a "cube corner", and the diagonal of an imaginary cube to which this cube corner belongs constitutes a reference axis referred to as the retroreflector normal. A property of such a retroreflector target is to reflect incident rays back parallel to themselves. Thus, reflecting the laser beam back towards the transmitter, even over very large distances, does not require the cube corner axis to be pointed towards the transmitter, provided that the laser pulse penetrates the cube corner, and of course, that the orthogonality of the reflecting surfaces is as perfect as possible.

In fact, the pulse reflected by a perfect cube corner has only one diffraction lobe, with an energy peak in the reflection direction and whose equivalent width can be given, as a first approximation, by the relation l/d, where l is the wavelength of the incident pulse and d is the average transverse dimension of the target (improperly called the effective diameter, or simply, the diameter). Thus, for a 0.5 µm wavelength (green in color) and a target diameter of 10 cm, the lobe width (in the absence of any disturbing medium) is about one arcsecond (this width is in fact the subtended angle through which an observer placed at the target would see this reflected pulse).

As long as the subtended angle through which the target sees the separation between the transmitter (at the time when the incident pulse is transmitted) and the receiver (at the time when the reflected pulse reaches the latter) is smaller that the lobe width, the ranging principle indicated above may be appropriately employed. However, the received to transmitted energy ratio of the transmitter-receiver unit decreases whenever there is a large relative velocity between the transmitter-receiver unit and the retroreflecting target, transversal to the direction of a straight line joining them; in fact it is known in this case to define a velocity aberration angle, which depends on the ratio between the relative transverse velocity and the laser beam velocity (or speed of light). When this velocity aberration angle becomes greater than the lobe width, this means that the receiver is transversely offset from the diffraction lobe of the reflected pulse, when the latter reaches the location previously occupied by the transmitter-receiver unit at the instant of pulse emission.

To compensate for this velocity aberration, it has already been proposed to change by a few arcseconds the right angles between the three reflecting faces of the target, so as to widen the return beam. However, in practice, when this modification angle is increased from zero, the diffraction lobe, which was initially unique in a three dimensional graph correlating the energy density transmitted by the target in one direction with two tilt angles characterizing the spatial orientation of this direction relative to the incident pulse direction, widens and develops in its center a depression surrounded by an irregular ring; specifically, this ring embodies six peaks which interpenetrate one another and are arranged in a circle.

Within a given retroreflector, one thus obtains an "omnidirectional" correction of the velocity aberration, which however becomes insufficient when the latter substantially exceeds the average width of the six individual lobes, because any additional increase in these modification angles results in the breaking-up of the aforementioned ring into six separate lobes: the compensation effect becomes uncertain according to whether, as a result of the relative transverse velocity, the receiver intercepts one of these six lobes, the light energy is reduced since it does not exceed more than a sixth of the total energy.

It has thus been proposed to provide, on the target, a plurality of small retroreflectors, randomly oriented about their normals so as to generate an overall return pulse composed of a plurality of elementary pulses, the sets of six lobes of which would be mutually complementary, so as to form a ring-like lobe. However, the use of several retroreflectors contributing to this overall lobe deteriorates the measurement accuracy, in particular by virtue of the differences in the position of these retroreflectors on the target, which induce a time-wise spreading of the pulse arrivals at the receiver, and by virtue of the small size of these retroreflectors, which limits the energy of the individual return pulses to a low level.

The applicant has already proposed to mitigate these drawbacks, and even for large transverse velocities, to ensure an efficient correction of the velocity aberration and to obtain high accuracy measurements, while maintaining a high ratio of received to emitted light energy.

In order to do so the applicant has proposed, in U.S. Pat. No. 5,202,743, owned by the common assignee hereof, to abandon the symmetry principle applied so far in laser ranging, where the orientation of cube corners about their normals was of little importance, or where the same requirements applied to all three dihedral angles.

In this respect, the applicant taught how to generate a return pulse in a very small number of retroreflectors, designed and arranged so that the return energy is broken-up, no longer into six lobes, but into only two, which are parallel to the transverse relative velocity.

More specifically, in the aforementioned application, the applicant proposed a long distance laser ranging device embodying a transmitter/receiver unit, conventional per se, which was adapted to transmit and receive a laser pulse, and a retroreflecting target adapted to receive this laser pulse and send it back parallel to itself, in which the transmitter-receiver unit moved relative to the target along a trajectory, in some points of which the unit had an overall relative velocity V and, normal to an instantaneous imaginary line joining it to the target, had a transverse relative velocity $V_t$ which is on average of the order of at least 1 km/sec. The target embodies at least one retroreflector in the form of a cube corner whose field of view intercepts the trajectory in at least one portion thereof and which has three plane reflecting faces which determine three dihedral angles converging towards an apex, of which two faces are orthogonal to the third one while forming with each other an angle differing from 90° by a deviation value e equal to at least one arcsecond. The faces converge into a so-called "corrected dihedral angle", contained in a plane intersecting the cube corner normal and at least approximately perpendicular to the average orientation of the relative transverse velocity in this or these portion(s) of the trajectory, with the deviation ε ranging between the minimum and maximum values of the expression $V_t/(C.\sin\Theta)$, in radians, over the portion(s) of trajectory intercepted by the retroreflector field of view, where $V_t$ and $\Theta$ are, for a given point in this or these portions, respectively the relative transverse velocity and the angle between the imaginary line joining this point to the target and the corrected dihedral angle, and where C is the speed of light.

In other words, when the trajectory of the transmitter-receiver relative to the target is of an orbital nature (that is when the transmitter-receiver (conversely the target) travels along an orbit with respect to a celestial body—a planet such as Earth or the moon—carrying the target (conversely the transmitter-receiver)), the plane P is at least approximately normal to the planes defined by the orbital trajectory portions intercepted by the cube corner field of view.

The transverse velocities known today usually correspond to deviation angles in the range of approximately 1 to 10 arcseconds.

Such a retroreflector has a maximum transverse dimension (called "effective diameter") typically of about 10 cm.

In fact, in this prior application, the applicant was particularly concerned with ground targets, whereas the transmitter-receiver was carried by a spacecraft.

The present application deals with the opposite scenario, in which a transmitter-receiver is placed on the ground, and one (or several) retroreflector(s) are space-borne.

In fact, laser ranging between a transmitting-receiving ground station and a geodetic satellite with conventional retroreflectors is now known to enable distance measurements with an accuracy of the order of 1 to 2 cm. This residual uncertainty depends for the moment mainly on the uncertainties arising from models of laser transmission through the Earth's atmosphere.

The future use of laser stations equipped with a two-color transmission capacity is expected, provided sufficient light energy is returned, to enable the uncertainty related to transmission through the atmosphere to be reduced to a few millimeters at the most. The main source of uncertainty will then be the geometry of the geodetic satellite itself.

In this regard, the existing geodetic satellites are simply dense spherical balls, several tens of centimeters in diameter, equipped with a large number of small, solid cube corner retroreflectors. A single laser pulse, emitted from the station and intercepting the sphere, thus results (as mentioned above) in a plurality of return pulses which are not quite simultaneous, and having therebetween random phase shifts. When received at the ground, this results in a return pulse which is weakly coherent and time spread, giving rise to an uncertainty in the identification of the exact instant of the pulse return.

SUMMARY OF THE INVENTION

The purpose of the invention is to mitigate this drawback, by applying, preferably but not necessarily, the proposals of the aforementioned unpublished application to the case of one or several space-borne retroreflectors. More specifically, it is a first object of the present invention to provide a spacecraft for accurate distance measurements with respect to points on the ground, embodying one (or several) retroreflector(s) designed to ensure efficient correction of the velocity aberration while maintaining a substantial return of light energy. An additional advantageous object of the invention is to enable the return pulses to be weakly spread in time and to enable the position (distance and orientation) of a chosen reference point of each retroreflector (in practice its apex) to be accurately known with respect to the satellite, and in particular to its center of mass. Another object of the invention is to achieve one and/or the other of the aforementioned aims while remaining, preferably, compatible with the cost, volume, mass and performance characteristics of low-mass satellites (less than 500 kg in the case of minisatellites, or less than 100 kg or even 50 kg in the case of microsatellites), while minimizing the sensitivity of such performance to phenomena such as, for example, solar radiation pressure or atmospheric drag.

Specifically, a purpose of the present invention is to achieve high performance in a distance measurement mode called "geometric mode" where measurements are made quasi-simultaneously (for example within less than 15 minutes) between the geodetic satellite and a plurality of ground stations.

Accordingly, the invention proposes a spacecraft for geodetic applications, designed to travel along a trajectory in an orbital plane around a planet, embodying at least one cube corner retroreflector designed to point at least temporarily towards the planet and having an apex, a normal and three faces which are substantially orthogonal with respect to one another within an arcminute, forming three dihedral angles at substantially equal angular distances from the normal. The effective diameter of the cube corner is at least 3 cm, with the apex being located, relative to the center of mass of the spacecraft, at a distance such that its projection on an imaginary line joining the center of mass to the center of the planet remains at all times at a known value, to within variations of less than 5 cm.

This known value may remain constant or may vary in time in a known or predictable manner.

According to preferred or possibly combined embodiments:

1st case

The spacecraft further includes an attitude stabilization device adapted to stabilize the spacecraft around a yaw axis oriented towards the center of the planet, a pitch axis perpendicular to the orbital plane and a roll axis perpendicular to the yaw and pitch axes and in the same direction as the instantaneous velocity, whereby the spacecraft is 3-axis stabilized;

it is a single retroreflector;

two of the faces of the single retroreflector are orthogonal to the third face and converge together into a so called corrected dihedral angle, at an angle differing from 90° by a nonzero deviation less than one arcminute, the single retroreflector being installed in the spacecraft so that the corrected dihedral angle and the normal form a plane perpendicular to the orbital plane;

the retroreflector is part of an assembly of at least two retroreflectors with substantially separate fields of view;

the retroreflector is part of an assembly of four retroreflectors located on the same side of a plane, joined together by their faces with their apexes in close mutual proximity;

two of the faces of each of the retroreflectors are orthogonal to the third face and converge together in a so-called corrected dihedral angle, at an angle differing from 90° by a nonzero deviation less than one arcminute, the retroreflectors being installed in a spacecraft so that their corrected dihedral angles are parallel to the pitch axis;

the assembly of four retroreflectors is made of a base-plate, a first partition joined along its edge to the base-plate in a direction parallel to the pitch axis forming with the base-plate an angle differing from 90° by a deviation value e, and a second partition joined at right angles to the base-plate and to the first partition;

the base-plate is parallel to the plane defined by the roll and pitch axes;

the attitude stabilization device is of a gradually acting type;

the attitude stabilization device is a continuously acting type;

the attitude stabilization device has at least two masts which extend in two directions of the roll-yaw plane;

the attitude stabilization device has at least one mast which extends in the direction of the roll axis and;

each apex is closely adjacent, to within a few centimeters, to the center of mass of the spacecraft.

2nd case

The spacecraft rotates around a spin axis and includes an attitude stabilization device adapted to maintain the autorotation axis perpendicular to the orbital plane, the apex of the retroreflector being at less than 5 centimeters (preferably less than 2 centimeters) from the spin axis;

the attitude stabilization device is of the gradually acting type;

the attitude stabilization device embodies at least one magnetometer and at least one coil;

the retroreflector is part of an assembly of retroreflectors whose fields of view are substantially separate;

the normal of each retroreflector passes at least approximately through the spin axis;

the retroreflector is part of an assembly of four retroreflectors, located on the same side of a plane transverse to the spin axis, having their faces parallel and their apexes located at the same distance, to within a few millimeters (less than 5 mm, or even 1 mm), from the spin axis, this distance being less than 5 centimeters;

two faces of each of the retroreflectors of a given assembly are orthogonal to the third face and converge together into a so-called corrected dihedral angle at an angle differing from 90° by a nonzero deviation less than one arcminute, the retroreflectors being fixed to a spacecraft so that their corrected dihedral angles are parallel to the pitch axis;

each assembly is made of a base-plate normal to the spin axis, and two partitions joined at right angles to the base-plate converging together at an angle differing form 90° by a value equal to the deviation $\epsilon$, the spacecraft embodies two assemblies of four retroreflectors, each located along a base plane perpendicular to the spin axis;

the base planes of the two assemblies are separated by a distance d parallel to the spin axis;

the distance d is less than half of the average dimension of the units, transverse to the autorotation axis;

the distance d fulfills the inequality $(d/2).\sin \Theta \leq t$, where $\Theta$ is the maximum inclination angle allowed between the spin axis and the orbital plane normal, and t is the maximum deviation allowed between the retroreflector apexes and the spin axis.

3rd case

The retroreflector is part of an assembly of at least four retroreflectors having their apexes located at the same distance, to within 1 mm, from the center of mass, this distance being less than 5 centimeters;

the retroreflector is part of an assembly of eight retroreflectors having their apexes located at the same distance, to within 1 mm, from the center of mass, this distance being less than 5 centimeters;

the normal of each retroreflector passes at least approximately through the center of mass;

each of the dihedral angles of each retroreflector exhibits, with respect to 90°, a nonzero deviation of less than one arcminute, with all deviations being equal to within 20%;

the deviation is less than 10 arcseconds; and the spacecraft is a minisatellite or a microsatellite.

In particular, it may noted that the invention envisions four cases:

a single retroreflector whose orientation towards the Earth (or another planet) is fixed, by virtue of a 3-axis stabilization system. This single reflector preferably has a single corrected dihedral angle which forms with the normal of the retroreflector a plane perpendicular to the orbital plane; the uncertainty in the value of the projection in the Earth-satellite direction of the apex/center of mass distance depends only on the stabilization quality;

a plurality of retroreflectors, preferably an assembly of four contiguous retroreflectors, whose orientation towards the Earth is fixed, by virtue of a 3-axis stabilization system. These reflectors have preferably a single corrected dihedral angle parallel to the pitch axis (perpendicular to the orbital plane). The same comments as above may be applied to the aforementioned uncertainty;

a plurality of retroreflectors, preferably contiguous, fixed on the same side of the space orbital plane, spin stabilized about an axis perpendicular to the orbital plane. There may be such an assembly on each side of the orbital plane. These reflectors have preferably a single corrected dihedral angle parallel to the spin axis. The aforementioned uncertainty then depends on the distance between the apexes and the spin axis and on the stabilization quality of this axis; and a plurality of advantageously contiguous retroreflectors, preferably four in number (whether contiguous or not) or eight (contiguous), each of which has an apex closely adjacent to the center of mass; their exact orientation is then of little importance. The retroreflectors may then have three dihedral angles, corrected by a deviation angle, typically less than one arcminute and preferably less than ten arcsecond (the corrected dihedral angles being preferably equal to one another to within 20%). The aforementioned uncertainty then depends on the distance between the apexes and the center of mass.

In the case of a 3-axis stabilized spacecraft the uncertainty in the value of the projection may be very small (a few millimeters at most), which may lead to an uncertainty of the same order, or even less, in the distance measurements carried out with the spacecraft.

On the other hand, in the aforementioned cases of a spin stabilized spacecraft, or without attitude control, it must be noted that the above mentioned uncertainty in the length of the projection along the apex/center of mass distance (spacecraft—center of planet) direction, which in fact corresponds to the local vertical direction, may be much greater than the uncertainty impairing the distance measurements carried out with such a spacecraft.

It should be recalled at this point that the aforementioned uncertainty in the distance measurements is a consequence of the uncertainty in the correction to be applied to the measurement of the transmitter-receiver/apex distance in order to obtain the transmitter-receiver/center of mass distance, for a given spacecraft attitude and for a given orientation of the beam intercepting the retroreflector under consideration. In this respect, it should be kept in mind that this uncertainty decreases with increasing accuracy of models representing the correction. In particular, it will be understood that such models may be very accurate in the case of a 3-axis stabilized spacecraft.

However, it should also be realized that models can also be developed in other cases, whether one is concerned with a spin stabilized spacecraft with a known orientation, or even in the case of an unstabilized spacecraft, in particular by taking into account the fact that a retroreflector can contribute to a measurement only under the condition that it is penetrated by the light ray at the time under consideration, meaning that the ray actually forms an angle in practice less than approximately 40° with respect to the normal of this retroreflector; in other words it is possible, after a beam transmitted in a given direction has been reflected, to at least know that this beam has intercepted a retroreflector, the normal of which formed an angle of at most 40° with this transmission direction. The distance correction may thus be modeled by taking into account the information available concerning the position of the center of mass relative to this retroreflector normal; in particular in the case (preferred, according to the invention) where the normal of each retroreflector passes through the center of mass, even without any stabilization, the distance correction to be applied may be modeled as follows: the true distance correction to be applied is equal to the projection of the distance d between the apex and the center of mass along the direction of transmission; this true correction lies in the range between d and d.cos 40°; this true correction may be approximated (other solutions are possible) by:

$$d \cdot \frac{(1 + \cos 40°)}{2}$$

the uncertainty in the correction thus modelized is then at most:

$$d \cdot \frac{(1 - \cos 40°)}{2}$$

that is approximately 0.1 d. It may then be understood that if, for manufacturing reasons, retroreflectors are arranged on an unstabilized spacecraft, with their normals passing through the center of mass and with their apexes at a distance of 5 centimeters from the center of mass, distance measurements will nevertheless be able to be carried out to within about 5 mm.

A similar reasoning may be applied to a spin-stabilized spacecraft. The accuracy of the error model will be greater when the retroreflector normals pass through the spin axis.

Other objects, features and advantages of this invention will become apparent from the following detailed description of non-limiting examples thereof, upon reference to the accompanying drawings.

DETAILED DESCRIPTION OF THE PREFERRED EMBODIMENT

Figure 1:
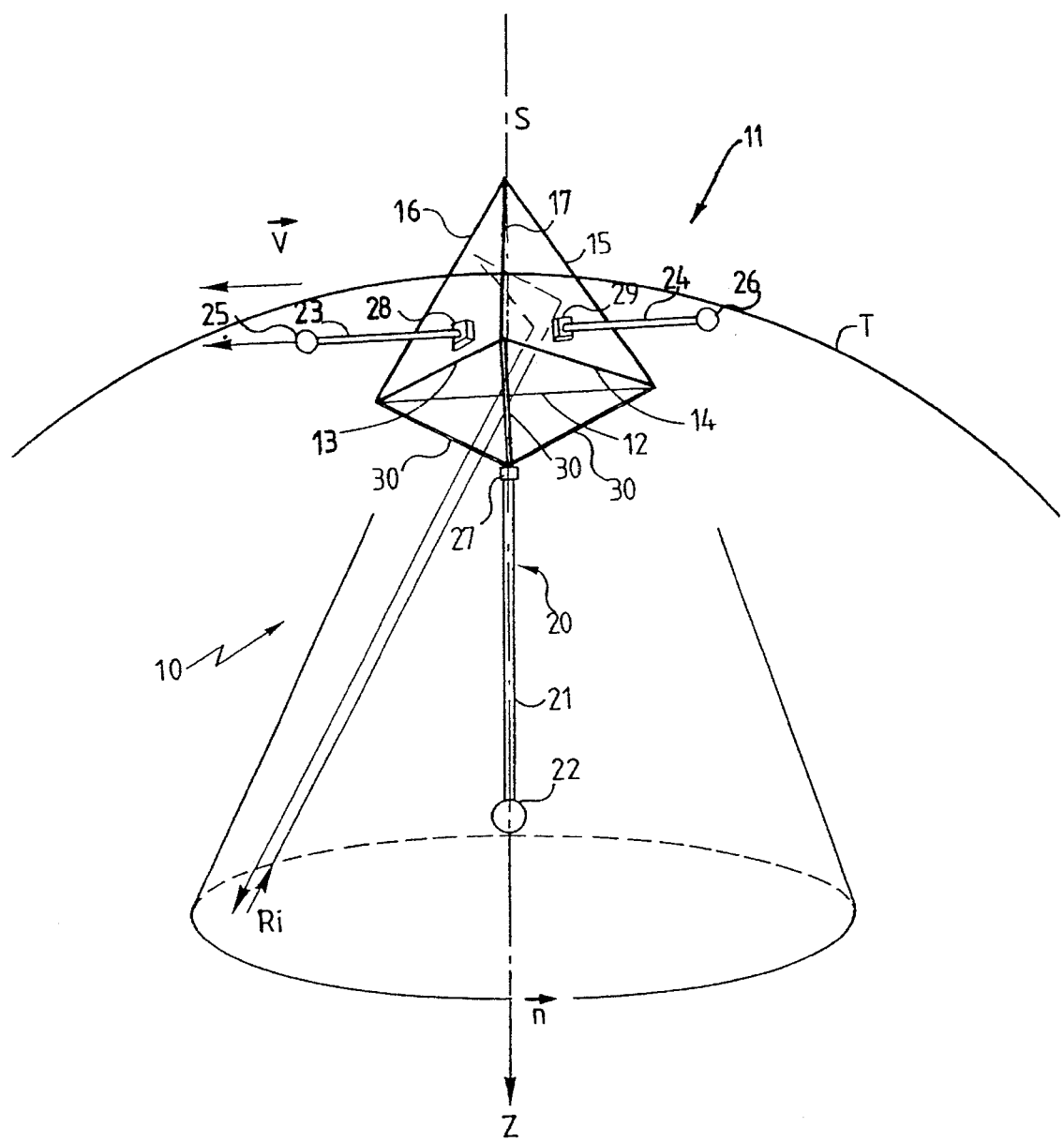
FIG. 1 is a schematic perspective view of a low mass retroreflector geodetic satellite, consistent to an aspect of the invention, in an extremely simplified embodiment.

FIG. 1 schematically shows a geodetic satellite according to the invention indicated as a whole by reference 10. It mainly embodies a cube corner retroreflector 11 and preferably an attitude control device 20.

The cube corner retroreflector 11 has three plane reflector faces 12, 13 and 14 which determine three dihedral angles 15, 16 and 17 converging towards an apex S. Preferably two of such faces, here faces 12 and 13, are orthogonal to the third face 14 while forming with each other an angle having a small but nonzero deviation $\epsilon$ from orthogonality, which is typically of the order of 1 to 10 arcseconds. The dihedral angle 17 defined by the aforementioned faces is referred to as the corrected dihedral angle.

Here, the cube corner retroreflector 11 is hollow but could be, according to an alternative not shown, a portion of a cube of bulk material transparent at the wavelength selected for the measurement pulses (see below).

The direction which forms an equal angle with the three dihedral angles 15, 16 and 17 is referred to as the cube corner normal $\vec{n}$ (it represents the diagonal of the imaginary cube to which the cube corner belongs). This normal forms an angle of 54.7°, thus near to 55°, with the dihedral angles. The field of view of the retroreflector is approximately a cone of half-angle 30°.

The average transverse dimension measured (transversely to the normal) at the retroreflector exit is referred to as the effective diameter; it is several centimeters (typically more than 3 cm) and preferably of the order of about ten centimeters.

An incident ray Ri included within the field of view is returned by the retroreflector, after reflection at the three faces, as a return ray which is substantially parallel to the direction of incidence.

The satellite 10 travels along a path T around the Earth while being stabilized by the attitude control device 20 so that the cube corner normal $\vec{n}$ is pointed towards the Earth. Specifically, a clockwise orthonormal reference system X Y Z of which the Z (yaw) axis is to be pointed towards the center of the Earth, the Y (pitch) axis is perpendicular to the orbital plane and the X (roll) axis completes the reference system so as to be pointed in the same direction as the instantaneous velocity of the satellite. The normal $\vec{n}$ of the cube corner is preferably, but not necessarily, aligned with the yaw axis; that is, preferably, but not necessarily, pointed towards the center of the Earth. These axes are in principle the main inertial axes.

The corrected dihedral angle 17 is oriented so that the plane defined by this dihedral angle and the normal $\vec{n}$ is, to within a few degrees (±10°, and preferably to within less than 5°), normal to the orbital plane.

The value of deviation ε lies between the minimum and maximum values assumed by the expression $v_t(c. \sin \Theta)$, in radians, for various inclinations of the incident ray, where $v_t$ is the instantaneous relative transverse velocity (that is, the component of the velocity v normal to the incident ray), Θ is the instantaneous angle between the ray direction and the corrected dihedral angle, and c is the speed of light: typically, this results in the aforementioned range of 1 to 10 arcseconds for orbital velocities typical of geodetic satellites (essentially low orbits).

Due to deviation ε, the incident ray is reflected with an energy maximum along two directions slightly shifted by a few arcseconds towards each side of the incident ray (which is in fact composed of a succession of several short pulses). Due to the aforementioned orthogonality condition between the orbital plane and the plane defined by the corrected dihedral angle, the two aforementioned maximum energy directions are shifted parallel to the trajectory, which ensures that, regardless of the velocity aberration due to the very large relative transverse velocity between the transmitter-receiver on the ground and the satellite, this emitter-receiver receives a significant amount of returned energy.

The principle of such a velocity aberration correction has already been described generally in the aforementioned U.S. Pat. No. 5,202,743, issued on Apr. 13, 1993.

The attitude control device 20, itself of any known appropriate type, is here advantageously of the passive type, in the sense that, after the satellite has been commissioned in its service orbit, it no longer consumes any power.

More specifically, this device takes advantage of the natural torque of gravitational forces (terrestrial in our example) exerted on a body (terrestrial satellite in our example) having substantial differences between its principal moments of inertia.

Thus, the gravitational torque tends to bring into stable alignment with the geocentric direction the principal axis of inertia with which the smallest inertial moment is associated, insofar as certain stability requirements are fulfilled by the major inertial moments of the satellite (in particular that the difference between the absolute value of the principal transverse moments is less than the smallest principal moment and that the principal transverse moments are substantially different from one another). To this end, the control device 20 embodies a set of masts arranged symmetrically in the roll-yaw plane with respect to the yaw axis; the control device 20 embodies a mast 21 which extends along the yaw axis Z towards the Earth, and which is preferably terminated with a mass 22. Advantageously, the satellite also embodies a mast, not shown, which extends along the axis but in the opposite direction of the mast 21. Apart from the fact that it increases the moment of inertia associated with the other principal axes of inertia X and Y, such a second mast, in practice symmetrical with respect to the first one, has the advantage of limiting the perturbating torques (in particular those due to atmospheric drag in the case of low orbits—which may be the case of some geodetic satellites—or to solar radiation pressure). A further advantage is to enable the center of mass to be freely positioned, preferably near to the apex S.

As they extend along axis Z, the mast(s) ensures an attitude stabilization of this axis. In order to ensure a stabilization of the satellite about these other two axes, the control device 20 further includes two masts 23 and 24 which extend in opposite directions along the roll axis X and are terminated with masses 25 and 26.

In practice, these arms are telescopic, and are controlled in their extension after separation from the launchcraft by extension motors 27, 28 and 29. Preferably, these arms are not directly attached to the retroreflector 11 but are fixed to a support structure with rods 30, linking the mast 21 to the rest of the satellite, as shown in FIG. 1.

The satellite 10 is a very simple version of the invention.

In practice the gravity mast stabilization system is completed by a suitable device, known per se, for station-keeping assistance (magnetic coil(s) and/or chargeable battery or batteries and one or several attitude sensors: magnetometer(s), Earth sensor, sun sensor(s) and a communications system allowing remote controls to be received from the ground), in addition to a damping device, preferably jointless, (for example hysteresis bar(s) or a magnetic anchoring system).

In practice, power supply to the consuming equipment requires setting up a power distribution system, a battery and solar cells, as well as a thermal control device which should be as passive as possible.

Figure 7:
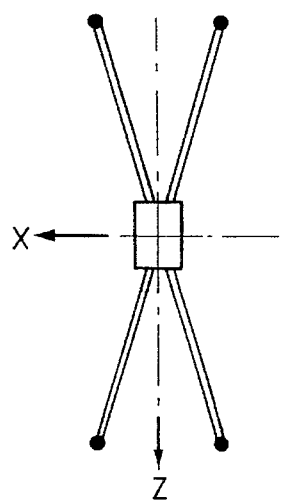
FIG. 7 is a schematic view of a modification of a gravity mast stabilization system.

Other 3-axis stabilization systems using gravity masts in the roll-yaw plane are possible, such as that schematically shown in FIG. 7, with masts arranged symmetrically in the form of a Saint-Andrew's cross on both sides of the yaw axis, with respect to which they have nevertheless only a slight inclination, so that the aforementioned conditions applied to the principal moments of inertia, can be fulfilled.

Figure 2:
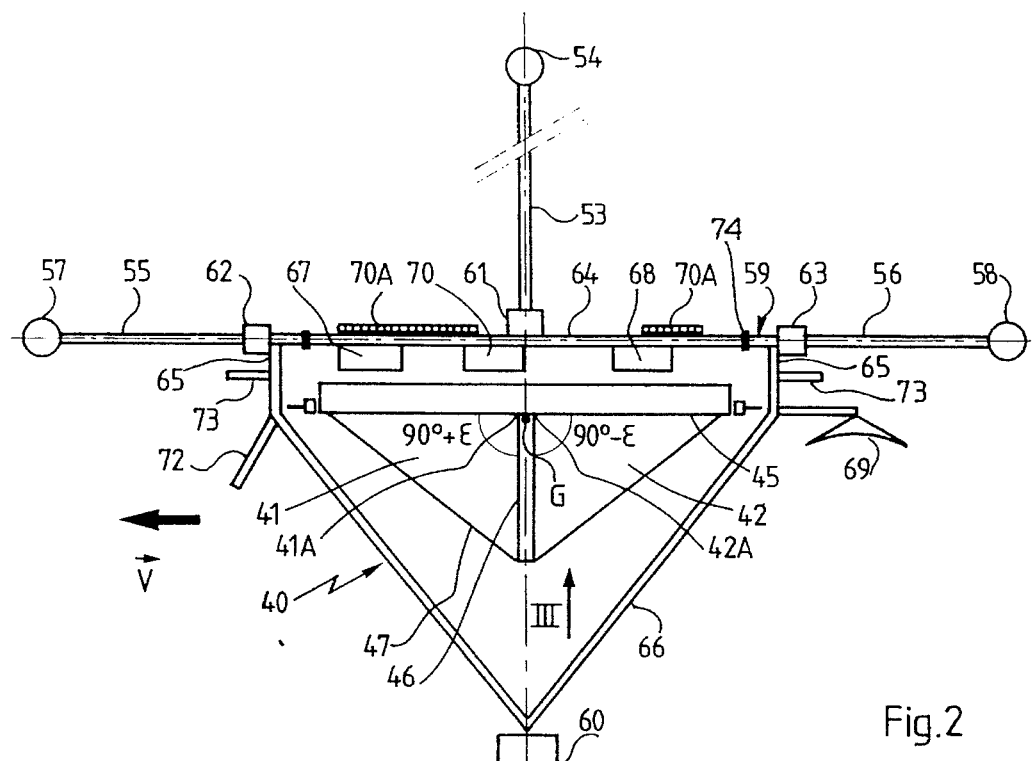
FIG. 2 is a schematic view of another geodetic satellite according to the invention, in a version using four retroreflectors.

FIG. 2 shows anther 3-axis stabilized geodetic satellite according to the invention, generally indicated by reference 40.

The satellite 40 mainly differs from the satellite in FIG. 1 by the fact that instead of a single retroreflector, it embodies an assembly of four retroreflectors 41, 42, 43 and 44 (see FIG. 3) joined together so that their apexes are immediately adjacent to one another (typically to within less than 5 cm) while having separate fields of view.

More specifically, the retroreflector assembly includes a base-plate 45, and two partitions 46 and 47 intersecting each other at a right angle and being substantially parallel to the base-plate. In practice, one of the partitions 46, referred to as the principal partition, is in the form of a single part whereas the other partition 47, called the secondary partition, has two parts. These partitions define at their intersection a direction substantially perpendicular to the base-plate which will be referred to as the normal of the retroreflector assembly. Advantageously, this normal extends along the yaw axis Z whereas the partitions 46 and 47 extend parallel to the pitch and roll axis, respectively (or conversely).

The partition (here 46), which is parallel to the pitch axis exhibits a deviation ϵ from orthogonality (positive on one side of this partition, and negative on the other) with respect to the base-plate whereas the other partition (here 47), which is parallel to the roll axis, is strictly normal to the base-plate as well as to the partition parallel to Y (of course, to within the manufacturing tolerances which are of the order of one arcsecond).

Thus, each of the four retroreflectors have a single corrected dihedral angle shown as 41A, 42A, 43A or 44A, which is parallel to the pitch axis whereby the aforementioned orthogonality condition between the plane, defined by the normal and the corrected dihedral angle of each retroreflector, and the orbital plane is fulfilled.

One may appreciate the simplicity of the block structure formed by retroreflectors 41 to 44.

The assembly of the base-plate and the partitions is for example ensured by bonding and/or molecular adhesion.

Other methods of manufacture are possible. The set of retroreflectors could thus be obtained, for example, by depositing reflecting surfaces onto a cast monoblock structure, using the so-called replication technique. Fulfillment of the angle requirements depends of course on the quality of the master piece used to make the replicas. Each retroreflector thus constitutes a monblock module, and the retroflector assembly is formed by assembling such modules. Such an assembly of modules has such advantages as dissociating the manufacturing operations of each module from their assembly, resulting in less significant consequences in case of manufacturing problems.

The tolerance on the parallelism of the four corrected dihedral angles is for example ±1°. It should be noted here that the assembly technique indicated below in relation to FIG. 3 ensures a very high degree of parallelism between the corrected dihedral angles.

As for the alignment of the corrected dihedral angles with the local normal to the orbital plane, the desired accuracy is for example ± 10°, preferably ±5° (it should be recalled that the satellites referred to here (microsatellites) are small in size and mass, which could justify less severe attitude control requirements than for normal satellites: several tons and several meters in dimension).

The fact that the four retroreflectors have separate fields of view, as opposed to what would be expected, is not a major obstacle even if the normal defined above for the retroreflector assembly is not contained within any of the retroreflector fields of view. Indeed, no particular direction of this normal is in practice favored for the transmission-reception. Moreover, this direction is blocked out in the example given in FIG. 2 by the presence of a stabilization mast extending along the yaw axis.

The satellite 40 shown in FIG. 2 is in effect attitude stabilized, as that of FIG. 1, in a passive manner.

It thus is provided with a principal longitudinal stabilization mast 51 extending along the yaw axis, towards the Earth, and terminated by a mass 52, a secondary longitudinal stabilization mast 53 extending in the opposite direction to the principal mast 51 and terminated by a mass 54, in addition to two shorter transverse stabilization masts 55 and 56, extending along the roll axis and terminated by masses 57 and 58. These masts are in practice telescopic and are connected to a support structure 59, in which the retroreflector assembly is placed, by extension servo motors shown by references 60 to 63.

The support structure 59 includes a rear plate 64 transverse to the yaw axis, side partitions 65 and a rod 66, to which various satellite pieces of equipment are attached, such as:

an electronic unit 67 for controlling the mast extension motors;

an electronic telecommunications unit 68 for exchanging ranging and remote controls with the ground by means of an antenna 69;

a battery 70;

solar panels 70A which are either folding or fixed to the support structure, pointing outwards and arranged in number, size and orientation so as to satisfy the electric power needs of the satellite; and Earth sensors 72, sun sensors 73, or magnetometers (not represented).

It should be noted that there is, between the base-plate 45 of the retroreflector assembly and the rear plate 64 of the support structure, a space which could easily be adapted to contain some of the aforementioned pieces of equipment.

Counter-balancing masses, schematically represented by 74, are advantageously provided to enable, on account of the length of the masts and their associated masses, the center of mass G of the satellite to be brought as close as possible to the retroreflector apexes, by virtue of which any possible attitude drift of the satellite has only a minimal effect on the accuracy of the distance measurements between the retroreflector apexes and the transmitter-receiver stations on the ground.

This accuracy, including the case of an attitude drift, increases with increasing proximity of the apexes to the center of mass (this comment also applies to the satellite of FIG. 1 which has a single apex).

As an example, the base-plate 45 has a diameter of 200 mm and the partitions 46 and 47 (here triangular in shape, although other shapes such as semi-circular, semi-elliptical, polygonal, and the like, are possible) have a thickness of 15 mm (or less).

The thickness of the partitions 46 and 47 must be sufficient to ensure a good stiffness of the retroreflector assembly and to ensure a good optical quality of the reflecting surfaces regardless of any possible thermal disturbances or centrifugal effects. The thinner these partitions, the closer the optical apexes can be to one another (see above) and the smaller are the distance errors affecting the measurements by a possible attitude drift.

The stabilization device of the satellite 40 is essentially of the passive type, based on the terrestrial gravity gradient. This stabilization technique, known per se, could be sufficient to maintain the satellite in its rated attitude with the aforementioned accuracy (±10°).

In practice, the existence of the aforementioned additional equipment, intended in particular for communications purposes, for power supply as well as for the purposes of thermal control, means that the satellite cannot be entirely passive. Preferably, the additional active or passive elements are attached so as to improve stabilization.

Other known 3-axis stabilization techniques can however be used (alone or combined).

According to a variation of the embodiment, the yaw stabilization is achieved passively by means of one or two masts which extend along this yaw axis whereas the stabilization of the other axes is achieved actively, for example with a (magnetometer+magnetic coil) unit.

According to yet another variation, the stabilization is implemented actively, by means of the concept of an on-board kinetic moment, servo-aligned with the axis normal to the orbital plane, this kinetic moment being materialized by a momentum wheel running nominally at a nonzero mean velocity or a reaction wheel used as a momentum wheel. This embodiment may be associated with a yaw mast and a pitch wheel.

According to further variations one could use two, three, four or even more wheels, with consecutive improvements in pointing accuracies, but increased mass, electric consumption and costs.

It should be noted that an attitude drift is acceptable, even if the retroreflector apex(es) are offset from the center of mass, provided one can, by means of telecommunications with the ground, accurately determine the position of this apex relative to the center of mass, to the geocentric direction and to the instantaneous tangent of the trajectory.

It will be appreciated that in principle, since the satellite is 3-axis stabilized, the uncertainty in the length of the projection along the local vertical (Z) of the distance of each retroreflector apex from the center of mass is very small (manufacturing tolerances (below one mm) plus stabilization tolerances).

Figure 4:
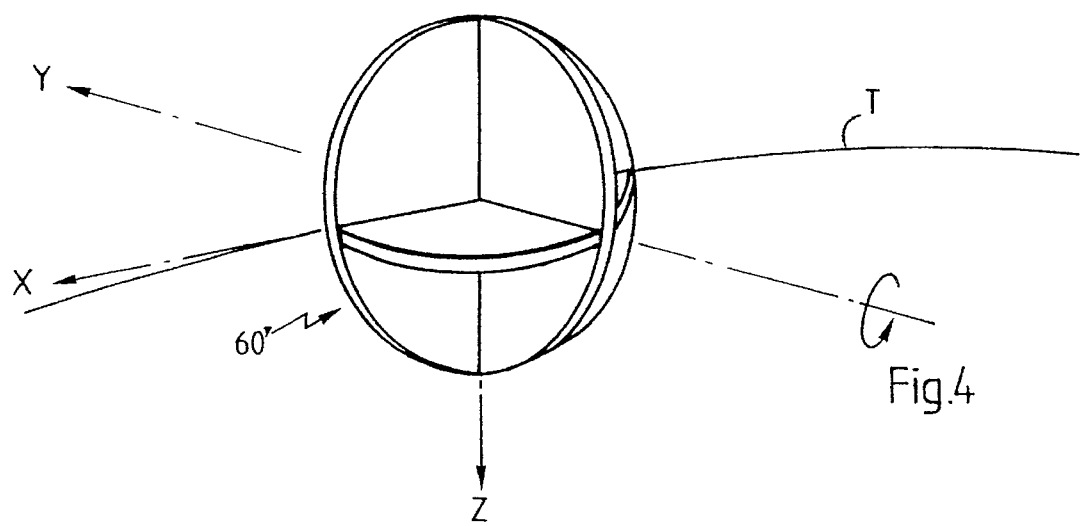
FIG. 4 is an explanatory perspective view of another geodetic satellite with eight retroreflectors, according to the invention.

FIG. 4 schematically illustrates a spacecraft 60 embodying eight retroreflectors in the form of cube corners with contiguous apexes closely adjacent to the center of mass (at equal distances from the latter, to within one millimeter, these distances being less than 5 cm). The normals of these retroreflectors pass as close as possible to the center of mass (which, as has been seen, facilitates modelling of measurement corrections). In a variation of this arrangement, not shown here, the spacecraft may include less than eight retroreflectors, in order to simplify the installation of other pieces of equipment. It may, for example, be sufficient to replace every second retroreflector with some other equipment. Nevertheless, for practical reasons, it seems preferable to keep at least four retroreflectors, for example non-contiguous, in order to ensure a minimal angular coverage; the faces are not necessarily parallel; however, the center of mass should still be kept aligned with the normals of the various retroreflectors.

As previously indicated, the retroreflectors may be formed of plates (cf. FIGS. 2 and 3); nevertheless, it is preferred to manufacture them into modules, so as to keep a maximum freedom in their installation.

The effective diameter of the various retroreflectors is preferably of the order of 10 cm or more, and is advantageously the same for all the retroreflectors of a given spacecraft (this is applicable to all the examples considered here.)

The spacecraft may assume any orientation, and eventually have corrections to its three dihedral angles (by nonzero quantities less than 1 arcminute, or even less than 10 arcseconds, and equal to one another to within 20%).

However, in an alternative embodiment, this satellite is characterized by a rotational movement around one of its axes which is adapted to be normal to the orbital plane. Each of the retroreflectors thus preferably has a single corrected dihedral angle parallel to the rotation axis. Therefore, the satellite has a group of four retroreflectors, such as that shown in FIGS. 2 and 3, facing the Earth at any time, that is, a group of four retroreflectors having single corrected dihedral angles parallel to the Y axis. This satellite can thus be considered as consisting of two retroreflector assemblies of the type described in FIGS. 2 and 3, assembled back to back.

However, the arrangement of FIG. 4 with eight retroreflectors means that it may be difficult to install other equipment (such as the attitude stabilization system) without obstructing the field of view of one or the other of the retroreflectors.

Figure 5:
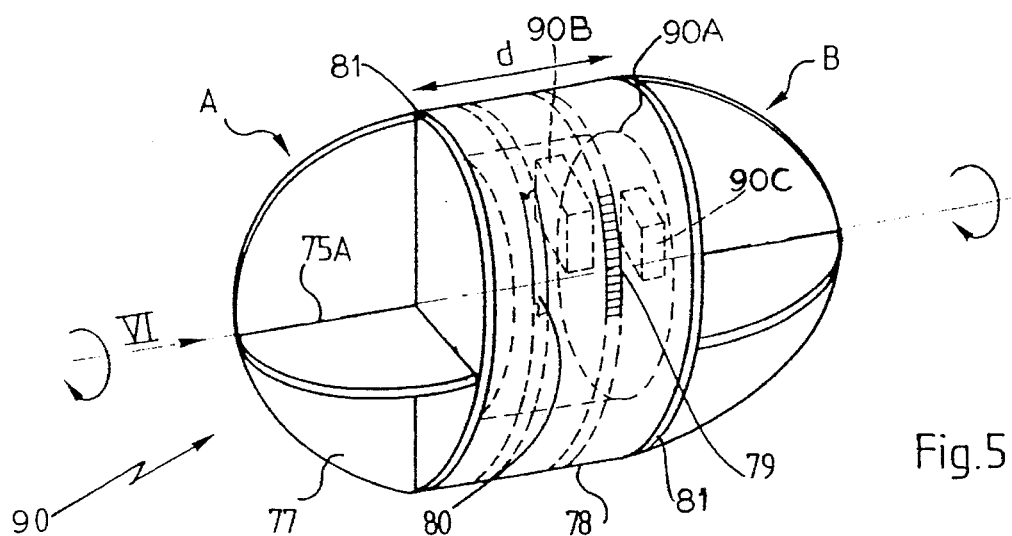
FIG. 5 is a schematic view of another satellite according to an alternative of the one shown in FIG. 4.
Figure 6:
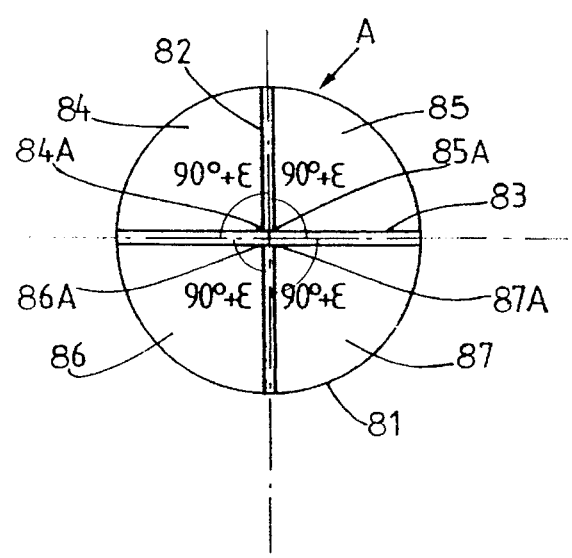
FIG. 6 is an end-on view of the satellite, as along arrow VI in FIG. 5.

Therefore, it is preferred, as will be apparent in connection with FIGS. 5 and 6, to divide these eight retroreflectors into two groups, A and B, of four retroreflectors.

FIGS. 5 and 6 mentioned above refer to a spin stabilization about a main inertial axis of the satellite; this axis is preferably the main satellite axis associated with the highest moment of inertia. In principle, it is normal to the orbital plane.

Generally, as is apparent from FIG. 6, each of groups A and B has a base-plate 81 transversal to the rotational axis and two partitions 82 and 83 strictly orthogonal to the base-plate, but with a deviation $\epsilon$ relative to their orthogonality so as to form four retroreflectors 84 to 87 having corrected dihedral angles 84A, 85A, 86A and 87A located adjacent to each other.

Thus, the retroreflector apexes which serve as reference points for distance measurements are at a very small distance from the rotational axis (less than 5 cm, or even only a few millimeters).

FIG. 5 shows a satellite 90 having groups A and B with their base-plates separated parallel to the rotational axis, by a distance d, so as to leave a free space for mounting the attitude stabilizer device schematically shown at 90A as well as other pieces of equipment (such as those mentioned in connection with FIG. 2). In FIG. 5, the retroreflector groups A and B are connected by means of a cylindrical wall 78 with the same diameter (typically 20 cm) as the base-plates. Schematically shown on this wall are solar cells 79 and a ring-like antenna 80, which may be of the micro-strip type. The stabilizer system 90A contained within this side wall may for instance include one (or several) magnetometer(s) 90B and magnetic coils 90C (an example of such a spin stabilization technique is described in Proceedings of the 4th Annual AIAA/USU Conference on small satellites, Vol 2, August 27–30, 1990: "Magnetic Attitude System for Spinning Small Spacecrafts" by P. K. Pal and V. H. Selby of ITHACO Company).

Distance d is preferably less than the radius of the base-plates 81, even if this requires an increase in the diameter of the side wall 78 well above that of the plates. More generally, the maximum value of d can be defined through the following relation:

$$(d/2).\sin \Theta \leq 5 \text{ mm}$$

where $\Theta$ is the maximum deviation of the spin axis relative to the normal to the orbital plane. This inequality expresses the fact that if the center of mass is actually located at the geometrical center of the satellite, the deviation of the retroreflector apexes from the instantaneous normal to the orbital plane (or to the center of mass) is smaller than the tolerance (here 5 mm) allowed for distance measurements.

Of course, other tolerance values may be selected, in the above inequality.

In fact, the retroreflector apexes are never exactly located on the above-mentioned instantaneous normal due to the nonzero thickness of the partitions 82 and 83. It seems to be preferable that the normals of the retroreflectors intersect the spin axis so as to facilitate modelling of distance corrections to be applied to distance measurements. The number of retroreflectors in each group is preferably four, though smaller numbers may be contemplated; in such cases, the faces will no longer be parallel.

Figure 3:
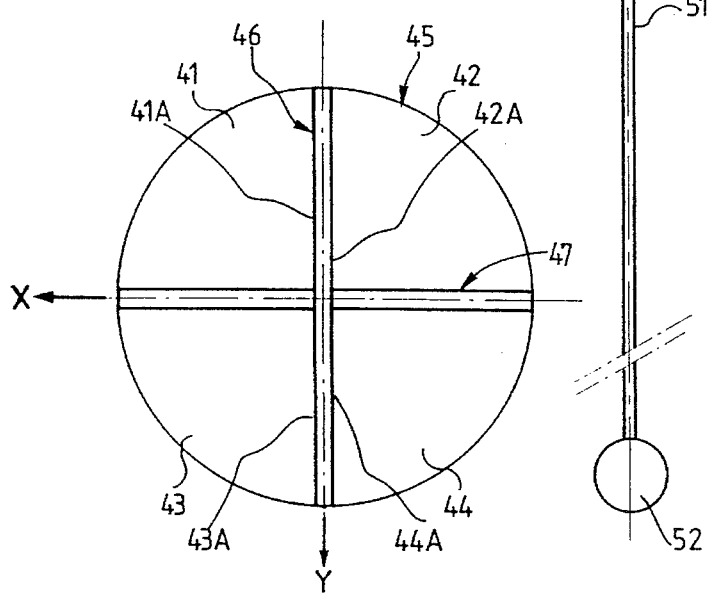
FIG. 3 is a view from below, along arrow III in FIG. 2, of the four-retroreflector assembly.

The same remarks as those regarding FIG. 3 apply to the dimensioning and configuration of these side walls or to the embodiment of monobloc modules.

Other kinds of actuators for stabilizing the rotational axis may be comtemplated.

In addition, the satellite stabilization system may include, in a manner known per se, nutation damping means (for example, of the magnetic type or based on the movement of viscous fluids in a straight or bent tube).

For orbits with small (or zero) inclination relative to the equatorial plane, a magnetic coil placed along the spin axis has very little efficiency; one may then use plane magnetic coils to control the direction of the spin axis and the spin velocity.

Preferably, in order to maintain a good accuracy (less than 5°) of alignment of the spin axis with the normal to the orbital plane, the satellite is advantageously provided with a so-called ground-based "horizon" sensor, which may be combined with solar sensors.

It will be appreciated that the satellites described above in connection with FIGS. 1 to 3 and 5 to 7, are equipped with slowly and gradually (or even continuously) acting attitude stabilization systems (of the three-axis or spin types), that is, without pulse motions, that are compatible with the small overall masses expected for the so-called mini- or microsatellites and with the requirement (related to geodetic applications) of minimizing disturbances affecting the orbital behavior. Thus, a gravitational passive stabilization system (with a 10 m post carrying a 4 kg mass) for a satellite of about 50 kg travelling along a circular orbit at 1200 km with a yaw moment of inertia of 30 kg.m$^2$, amounts to less than half the total mass. The mass of a wheel and magnetic system stabilizer device may be less than 10 kg, while the mass required for a spinned stabilization using a 2-axis magnetometer, two magnetic coils and a ground-based horizon sensor, may be estimated to be less than 5 kg, or even 1 kg, when a highly optimized stabilization is performed such as the one implemented in the "SCSC" or "MICROSAT" communications satellite by DEFENSE SYSTEMS INC. for the Defense Advanced Research Projects Agency (DARPA), with a stabilization system manufactured by ITHACO INC., of which Mr. Parimal K. Pal and Vaughn H. Selby (cited above) are members.

For example, for a relative satellite/Earth velocity of 5 to 8 km/sec., which corresponds to an angular velocity aberration of 6.9 arcseconds, ε ranges from 4.2" to 6.8"; and for a relative velocity of 3 km/sec., corresponding to an aberration of 4.1 arcseconds, ε is 2.5".

Since the retroreflector members make up, in the described microsatellites, most of the payload and are made up, in the described microsatellites, most of the payload and are made of light alloys (aluminum, titan and the like), the weight of such microsatellites, according to the indications given above about the stabilization system, is actually compatible with mass and size specifications of microsatellites. They can therefore easily be fitted under the nose cone of a carrier rocket (such as ARIANE) adjacent to a main satellite, or even be launched as clusters.

The above description has been given in a non-limiting sense and many modifications will occur to those skilled in the art while remaining within the scope of this invention.

What is claimed is:

1. A spacecraft for geodetic applications adapted to travel along a trajectory within an orbital plane about a planet, said spacecraft comprising:

at least one cube corner retroreflector adapted to face, at least temporarily, said planet, said at least one cube corner retroreflector having an apex, a retroreflector normal axis, and three reflecting planar faces substantially orthogonal to one another and converging into three dihegral angles forming substantially equal angles with respect to said retroreflector normal axis;

said at least one cube corner retroreflector further having an effective diameter of at least 3 centimeters;

means for locating said apex of said at least one cube corner retroreflector at a predetermined distance relative to the center of mass of said spacecraft; and means for maintaining a projection of said predetermined distance on a line connecting the center of mass of said spacecraft to the center of mass of said planet at a length which remains when said at least one retroreflector faces said planet at less than ±5 centimeters from a predetermined value.

2. A spacecraft according to claim 1, which further comprises an attitude stabilization device adapted to stabilize said spacecraft along a yaw axis directed towards the center of the planet, a pitch axis perpendicular to the orbital plane, and a roll axis normal to the yaw and pitch axes, in the same direction as the instantaneous velocity, such as to provide said spacecraft with a 3-axis stabilization.

3. A spacecraft according to claim 1, wherein said at least one cube corn retroreflector is a single retroreflector.

4. A spacecraft according to claim 3, wherein two of the faces of said three reflecting planar faces substantially orthogonal to one another of said single retroreflector are orthogonal to the third face and form together an angle differing from 90° by a nonzero deviation smaller than one arcminute, said angle being referred to as a corrected dihedral angle, said single retroreflector being installed inside said spacecraft so that said corrected dihedral angle and said retroreflector normal axis define a plane perpendicular to the orbital plane.

5. A spacecraft according to claim 2, wherein said at least one cube corner retroreflector is part of an assembly of at least two retroreflectors with substantially separate fields of view.

6. A spacecraft according to claim 5, wherein said at least one cube corner retroreflector is part of an assembly of four retroreflectors located on the same side of a plane, joined together by their faces with their apexes closely adjacent to each other.

7. A spacecraft according to claim 6, wherein two of the faces of each of said retroreflectors are normal to the third face and converge together into a corrected dihedral angle, defined by an angle differing from 90° by a nonzero deviation less than one arcminute, said four retroreflectors being installed inside said spacecraft so that their corrected dihedral angles are parallel to the pitch axis.

8. A spacecraft according to claim 7, wherein said assembly of four retroreflectors comprises a base-plate, a first partition joined along an edge to said base-plate parallel to the pitch axis, said first partition forming with said base-plate an angle differing from 90° by a deviation value ε, said assembly further comprising a second partition joined at a right angle to said base-plate and to said first partition.

9. A spacecraft according to claim 8, wherein said base-plate is parallel to the plane defined by the roll and pitch axes.

10. A spacecraft according to claim 2, wherein said attitude stabilization device is of the gradually acting type.

11. A spacecraft according to claim 10, wherein said stabilization device is of the continuously acting type.

12. A spacecraft according to claim 11, wherein said attitude stabilization device includes at least two masts extending along two directions in the roll-yaw plane.

13. A spacecraft according to claim 12, wherein said attitude stabilization device includes at least one mast extending along the yaw axis and at least one additional mast extending along the roll axis.

14. A spacecraft according to claim 2, wherein said apex of said at least one cube corner retroreflector is closely adjacent, to within less than a few centimeters, to the center of mass of said spacecraft.

15. A spacecraft according to claim 1, characterized in that it rotates about a spin axis and comprises an attitude stabilization device adapted to keep said spin axis normal to the orbital plane, said apex of said at least one cube corner retroreflector being at less than 5 centimeters from said spin axis.

16. A spacecraft according to claim 15, wherein said attitude stabilization device is of the gradually acting type.

17. A spacecraft according to claim 16, wherein said attitude stabilization device includes at least one magnetometer and at least one magnetic coil.

18. A spacecraft according to claim 15, wherein said at least one cube corner retroreflector is part of an assembly of retroreflectors whose fields of view are substantially separate.

19. A spacecraft according to claim 15, wherein said normal axis of each of said at least one cube corner retroreflectors passes at least approximately through the axis of rotation.

20. A spacecraft according to claim 15, wherein said at least one cube corner retroreflector is part of an assembly of four retroreflectors located on the same side of a plane transverse to said spin axis, each of said four retroreflectors having their faces parallel and their apexes located at the same distance from said spin axis, said distance being less than 5 centimeters.

21. A spacecraft according to claim 20, characterized in that two of the faces of each of said four retroreflectors in an assembly are normal to the third face and converge together to define a corrected dihedral angle, at an angle differing from 90° by a nonzero deviation less than one arcminute, said four retroreflectors being installed in a spacecraft so that their corrected dihedral angles are parallel to the pitch axis.

22. A spacecraft according to claim 21, wherein each assembly includes a base-plate located normal to said spin axis, and two spaced apart partitions joined at a right angle to said base-plate, said two spaced apart partitions converging together at an angle differing from 90° by a value equal to the deviation $\epsilon$.

23. A spacecraft according to claim 20 wherein said spacecraft includes two assemblies of four retroreflectors, each lying within a base plane normal to said spin axis.

24. A spacecraft according to claim 23, wherein said base planes of said two assemblies are separated by a distance d parallel to said spin axis.

25. A spacecraft according to claim 24, wherein said distance d is less than half the average peripheral dimension of said assemblies as measured transversely to said spin axis.

26. A spacecraft according to claim 24, wherein said distance d follows the inequality:

$$(d/2).\sin \Theta \leq t$$

where $\Theta$ is the maximum inclination angle allowed between the spin axis and the normal to the orbital plane, and where t is the maximum deviation allowed between said retroreflector apexes and said spin axis.

27. A spacecraft according to claim 1 characterized in that said at least one cube corner retroreflector is part of an assembly of at least four retroreflectors having their apexes at the same distance from the center of mass of said spacecraft, said distance being less than 5 centimeters.

28. A spacecraft according to claim 27, wherein the normal axis of each of said at least four retroreflectors passes at least approximately through the center of mass.

29. A spacecraft according to claim 27, wherein said at least one cube corner retroreflector is part of an assembly of eight retroreflectors having their apexes located at the same distance from the center of mass, said distance being less than 5 centimeters.

30. A spacecraft according to claim 27, wherein each of the apexes of each of said at least four retroreflectors has a nonzero deviation of less than one arcminute relative to 90°, all deviations being the same to within 20%

31. A spacecraft according to claim 30 wherein said deviation is less than 10 arcseconds.

32. A spacecraft according to claim 1, wherein said cube corner reflector is hollow.

33. A spacecraft according to claim 1, wherein said spacecraft is a minisatellite.

34. A spacecraft according to claim 33, wherein said spacecraft is a microsatellite.

\* \* \* \* \*

UNITED STATES PATENT AND TRADEMARK OFFICE
CERTIFICATE OF CORRECTION

PATENT NO. : 5,474,264
DATED : December 21, 1995
INVENTOR(S) : Glenn Lund and Sylvain Lemuet It is certified that error appears in the above-indentified patent and that said Letters Patent is hereby corrected as shown below:

Column 1, line 62, delete "that" insert ---- than ----.

Column 3, line 14, delete "e" insert ---- $\epsilon$ ----.

Column 5, line 24, delete "e" insert ---- $\epsilon$ ----.

Column 5, line 36, delete "axis and;" insert ---- axis; and ----.

Column 6, line 3, delete "form" insert ---- from ----.

Column 6, line 13, delete "(d/2).sin θ $\leq$ t," insert ---- (d/2).sin θ $\leq$ t, ----.

Column 6, line 37, after "may" insert ---- be ----.

Column 7, line 2, delete "arcsecond" insert ---- arcseconds ----.

Column 9, line 14, delete "orthornormal" insert ---- orthonormal ----.

Column 10, line 55, delete "anther" insert ---- another ----.

Column 11, line 35, delete "monblock" insert ---- monoblock ----.

Column 11, line 35 and 36, delete "retroflector" insert ---- retroreflector ----.

UNITED STATES PATENT AND TRADEMARK OFFICE
CERTIFICATE OF CORRECTION

PATENT NO. : 5,474,264
DATED : December 21, 1995
INVENTOR(S) : Glenn Lund and Sylvain Lemuet It is certified that error appears in the above-indentified patent and that said Letters Patent is hereby corrected as shown below:

Column 13, line 60, delete "here.)" insert ---- here). ----.

Column 14, line 59, delete "$(d/2).\sin \theta \leq 5$ mm" insert ---- $(d/2).\sin \theta \leq 5$ mm ----.

Column 15, line 14, delete "monobloc" insert ---- monoblock ----.

Column 15, line 61 and 62, delete ---- and are made up, in the described microsatellites, most of the payload ----.

Column 16, line 15, delete "dihegral" insert ---- dihedral ----.

Column 16, line 36, delete "corn" insert ---- corner ----.

Column 18, line 8, after "20" insert ---- , ----.

Column 18, line 20, delete "$(d/2).\sin \theta \leq$" insert ---- $(d/2).\sin \theta \leq t$ ----.

UNITED STATES PATENT AND TRADEMARK OFFICE
CERTIFICATE OF CORRECTION

PATENT NO. : 5,474,264
DATED : December 21, 1995
INVENTOR(S) : Glenn Lund and Sylvain Lemuet It is certified that error appears in the above-indentified patent and that said Letters Patent is hereby corrected as shown below:

Column 18, line 22, delete "the" first occurrence, insert ---- said ----.

Column 18, line 42, after "20%" insert ---- . ----.

Column 18, line 46, delete "reflector" insert ---- retroreflector ----.

Signed and Sealed this

Second Day of April, 1996

BRUCE LEHMAN

Attest:

*Attesting Officer*    *Commissioner of Patents and Trademarks*